(12) United States Patent
Fechner

(10) Patent No.: US 6,820,710 B2
(45) Date of Patent: Nov. 23, 2004

(54) MOTORCYCLE CRUISE CONTROL SYSTEM WITH BRAKE RELEASE

(76) Inventor: Bryan W. Fechner, 10905 SW. 78th Ave., Tigard, OR (US) 97223

( * ) Notice: Subject to any disclaimer, the term of this patent is extended or adjusted under 35 U.S.C. 154(b) by 72 days.

(21) Appl. No.: 10/241,267

(22) Filed: Sep. 11, 2002

(65) Prior Publication Data

US 2003/0047372 A1 Mar. 13, 2003

Related U.S. Application Data

(60) Provisional application No. 60/322,104, filed on Sep. 12, 2001.

(51) Int. Cl.[7] .................... B60K 31/00; B60K 26/00; B60K 41/26; B60K 41/20; G05G 1/00
(52) U.S. Cl. .................... 180/170; 180/333; 180/315; 192/220.1; 74/488; 74/491; 477/189; 477/192; 477/193
(58) Field of Search ................. 180/170, 333, 180/335, 336, 315, 370, 219; 192/220.1; 74/488, 489, 491, 531, 538, 539, 501.6, 502.2, 504, 506, 511 R; 477/189, 192, 193, 203

(56) References Cited

U.S. PATENT DOCUMENTS

| | | | | |
|---|---|---|---|---|
| 1,473,326 A | * | 11/1923 | Slawienski | 74/489 |
| 3,820,639 A | * | 6/1974 | Frueh | 477/192 |
| 3,845,847 A | * | 11/1974 | Camp | 477/204 |
| 3,935,916 A | * | 2/1976 | Ferraro | 180/219 |
| 3,982,446 A | | 9/1976 | Van Dyken | |
| 4,019,402 A | * | 4/1977 | Leonheart | 74/489 |
| 4,191,065 A | * | 3/1980 | Golobay et al. | 74/489 |
| 4,232,565 A | * | 11/1980 | Leonheart | 74/489 |
| 4,256,197 A | | 3/1981 | Kiser | |
| 4,286,699 A | * | 9/1981 | Pawelka | 477/209 |
| 4,286,700 A | * | 9/1981 | Morris et al. | 477/193 |
| 4,364,283 A | * | 12/1982 | Ricardo | 74/489 |
| 4,364,458 A | * | 12/1982 | Frueh | 477/192 |
| RE31,196 E | * | 4/1983 | Sowell | 74/488 |
| 4,587,937 A | * | 5/1986 | Masuda | 123/349 |
| 4,607,733 A | * | 8/1986 | Dodge | 477/194 |
| 4,620,575 A | * | 11/1986 | Cuba et al. | 180/307 |
| 4,848,502 A | * | 7/1989 | Kikuta et al. | 180/179 |
| 5,562,176 A | * | 10/1996 | Lucernoni et al. | 180/180 |
| 5,860,326 A | * | 1/1999 | Lussier | 74/489 |
| 5,893,295 A | | 4/1999 | Bronnert | |
| 6,250,173 B1 | | 6/2001 | Huston | |
| 6,317,673 B1 | * | 11/2001 | Lin | 701/70 |
| 6,318,490 B1 | * | 11/2001 | Laning | 180/170 |
| 6,484,855 B1 | * | 11/2002 | Yaple | 192/13 R |

* cited by examiner

Primary Examiner—Christopher P. Ellis
Assistant Examiner—Gerald B. Klebe
(74) Attorney, Agent, or Firm—Olson & Olson

(57) ABSTRACT

A motorcycle having a speed control rotary throttle grip and a pivoted brake lever both mounted on a steering handlebar, is provided with a split clamp ring surrounding the throttle grip and movable to releasably clamp the throttle grip against rotation from a preset position of cruising speed. A catch pin supported by one section of the split clamp ring is movable with the other section of the clamp ring to releasably secure the sections together. The catch pin is movable either manually by physical force or automatically by movement of the brake lever during braking of the motorcycle speed. Manual force may be applied to move a clamp lever, while automatic operation is achieved by movement of the brake lever into engagement with the clamp lever.

8 Claims, 5 Drawing Sheets

MOTORCYCLE CRUISE CONTROL SYSTEM WITH BRAKE RELEASE

This application claims the benefit of Provisional application Ser. No. 60/322,104, filed 12 Sep. 2001.

BACKGROUND OF THE INVENTION

This invention relates to cruise controls for vehicles, and more particularly to a motorcycle cruise control capable of disengaging automatically upon application of the wheel braking system.

A motorcycle cruise control is a device which, when engaged, holds the throttle grip of the motorcycle unless the motorcycle rider prevents it from doing so.

Most prior motorcycle cruise control systems require some deliberate physical manual maneuver to effect disengagement, thereby contributing to erratic or otherwise hazardous operating conditions. More sophisticated and expensive systems include electronic or electromechanical components to achieve automatic throttle release upon activation of the brake or other device.

SUMMARY OF THE INVENTION

The motorcycle cruise control of this invention includes a mechanical structural engagement with a motorcycle braking system that operates automatically to mechanically disengage the cruise control upon application of the wheel braking system.

It is the principal objective of this invention to provide a motorcycle cruise control with automatic brake release which overcomes the limitations and disadvantages of the prior art systems.

Another objective of this invention is the provision of a motorcycle cruise control with brake release wherein the brake release and cruise control are interconnected mechanically to effect automatic disengagement of the cruise control upon application of the wheel brake.

A further objective of this invention is to provide a motorcycle cruise control with automatic brake release of simplified mechanical structure for economical manufacture, maintenance and repair.

The foregoing and other objects and advantages of this invention will appear from the following detailed description, taken in connection with the accompanying drawings of preferred embodiments.

DESCRIPTION OF THE PREFFERED EMBODIMENTS

Figure 1:
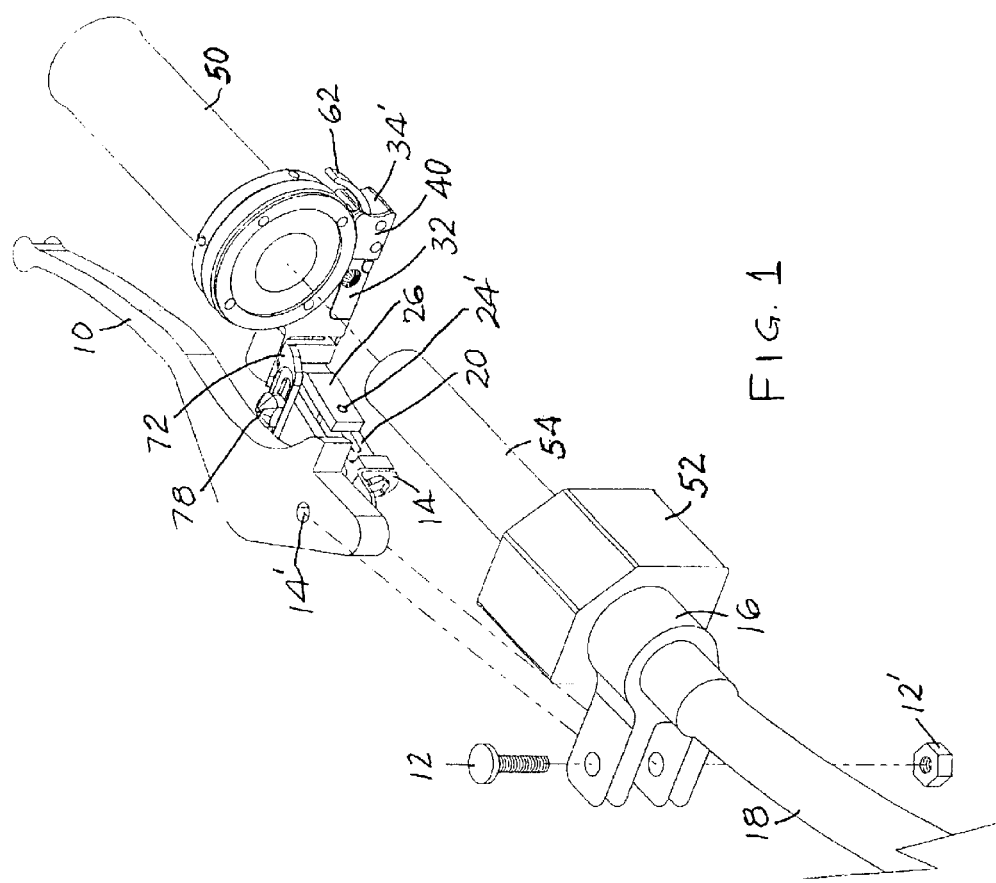
FIG. 1 is an exploded, fragmentary perspective view of one embodiment of motorcycle cruise control system of this invention associated with the accelerator throttle grip and front wheel brake lever.

Referring to the embodiment of FIGS. 1–4, there is shown a brake lever 10 (FIG. 1) coupled in conventional manner to a cable system (not shown) operatively connected to the front wheel brake of a motorcycle. The brake lever is supported by a pivot bolt 12 which extends through holes in lever 10 and end bracket 14. The bolt also extends through an opening in a mounting bracket 16 clamped to the handlebar 18 of a motorcycle, in well known manner. The nut 12' secures the assembly in adjusted position on the handlebar.

Figure 2:
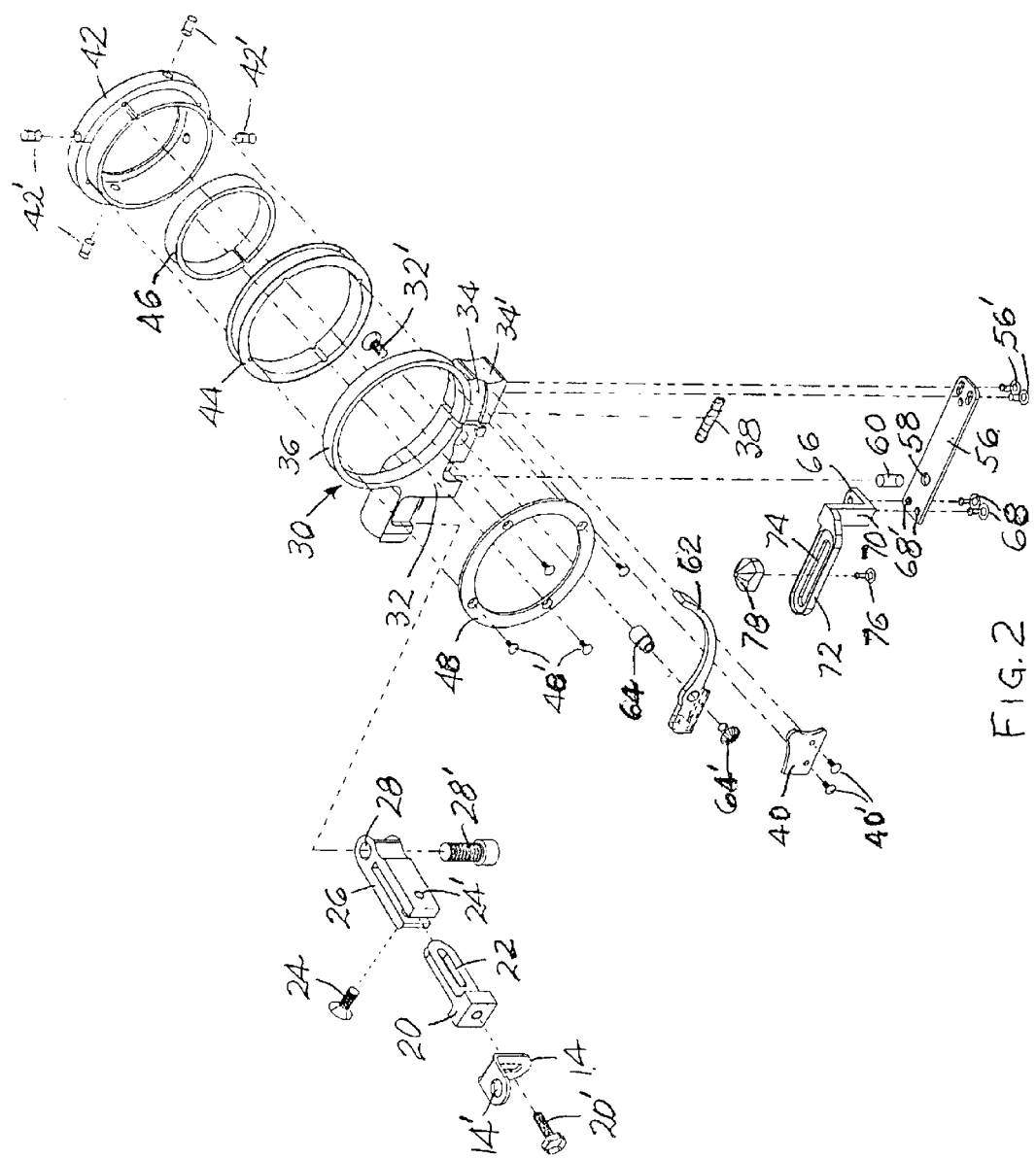
FIG. 2 is an exploded perspective view of the components of the system of FIG. 1.
Figure 3:
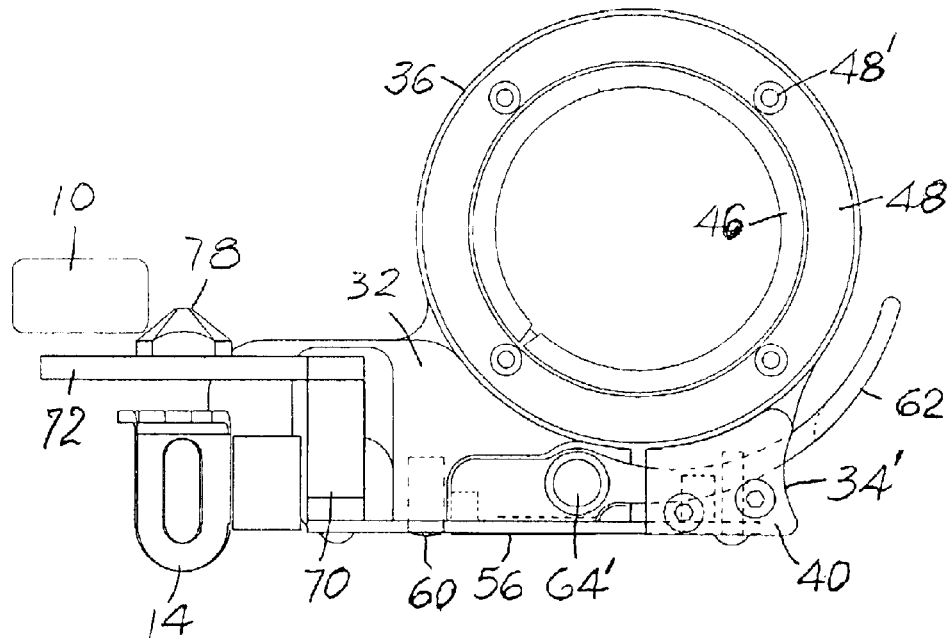
FIG. 3 is a vertical elevation of the system of FIG. 1 as viewed from the position of the motorcycle rider, the brake lever being shown in the normal, inoperative position.
Figure 4:
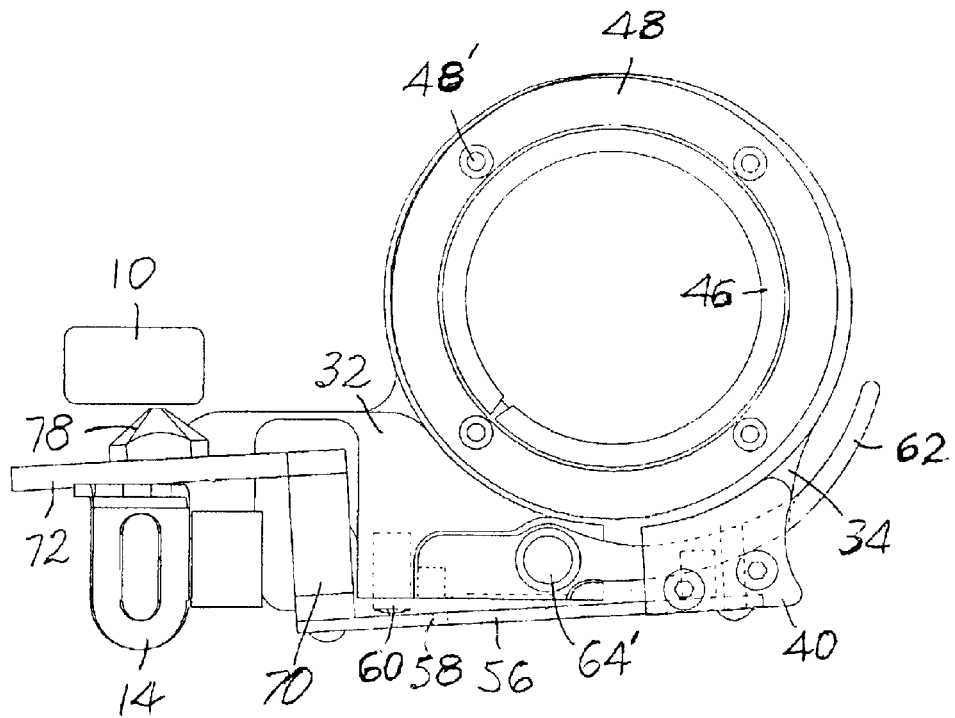
FIG. 4 is a vertical elevation similar to FIG. 3 with the brake lever being shown in the brake-applying position.

The end bracket 14 is secured to one end of an elongated arm 20 by screw 20' (FIG. 2). An elongated slot 22 in the arm 20 slidably receives a screw 24 which engages a threaded opening 24' adjacent one end of a second slotted arm 26 for longitudinal and arcuate adjustment relative to arm 20. The opposite end of arm 26 has an opening 28 through which extends a screw 28' for adjustable attachment of the arm to a lateral extension of a clamp member 30. The longitudinal adjustment of arm 20 and pivotal adjustment of arm 26 accommodates mounting of the control assembly on a wide variety of motorcycles.

The clamp member 30 is comprised of sections 32 and 34 joined through a resilient split clamp ring 36 by which the clamp sections may be movable toward and away from each other. A coil spring 38 is positioned in a groove in the bottom sides of clamp sections 32 and 34, to span the space between them and urge the sections resiliently apart. A cover plate 40 is secured to clamp section 34 by screws 40'.

Within the split clamp ring 36 is a slip ring 42 mounting plastic anti-friction ring 44. A plurality of circumferentially spaced set screws 42' on the slip ring engage the anchor ring 46 within the slip ring and move it into positive clamping engagement with a rotary throttle grip (FIG. 1) of a motorcycle engine speed control. Cover ring 48 is secured to slip ring 42 by screws 48' to form an integral unit of the rings. The inner end portion of the throttle grip 50 projects through the assembly of rings 36, 42, 44, 46 and 48, whereby the outer portion of the throttle grip is available for gripping by the hand of a motorcycle rider. The throttle grip is mounted for rotation on the outer end portion of the right or left end of the motorcycle handlebar 18 by housing 52 and throttle pipe 54. The grip is coupled to flexible cables (not shown) which extend to a motorcycle engine for controlling its speed, in well known manner. Spring loading of the throttle grip allows rotation through the speed range and return to idle position when released from the grip of a hand.

The cruise control embodiment of FIGS. 1–4 includes means for moving the sections 32 and 34 of clamp member 30 toward and away from each other, for releasably securing the throttle grip 50 against rotation from any desired cruising speed setting above idle. A spring plate 56 extends across the bottom sides of clamp sections 32 and 34, confining the spring 38 under it, and is secured adjacent one end to clamp section 34 by screws 56'. A hole 58 in the spring plate is arranged for registration with a catch pin 60 secured to and projecting downward from the bottom side of clamp section 32 when the clamp sections 32 and 34 are brought together to clamp the rotary throttle grip against rotation from a selected cruise speed position. The closed position of the clamp member 30 is achieved manually by applying thumb pressure against the outer end 34' of clamp section 34, against the resilient resistance of spring 38, to move the hole 58 in plate 56 into registry with catch pin 60.

Manual release of clamp member 30 from the closed position is afforded by manual release lever 62. The lever is supported pivotally intermediate its ends on standoff pin 64 and headed screw 64'. The standoff pin is secured to clamp section 32 by screw 32'. The inner end portion of the release lever 62 bears against the upper face of spring plate 56 and the outer end portion extends arcuately upward adjacent the clamp section 34. By pressing upward and inward on the outer arcuate end portion of the release lever, the opposite end of the lever presses downward on the spring plate 56 and retracts it from the catch pin 60. Spring 38 thereupon urges the clamp sections apart, releasing the throttle grip 50 to rotate back to its idle position.

This invention also affords automatic release of the throttle grip 50. The opposite end of the spring plate 56 mounts one leg 66 of an angle bracket, by means of screws 68 extending through registering openings 68' in the spring plate. The opposite leg 70 of the angle bracket is integral with elongated brake release arm 72. The arm is provided with an elongated slot 74 configured for sliding reception of a screw 76 which projects upward through the arm for attachment to cam 78. The arm 72 projects laterally from the clamp member 30, with cam 78 disposed for engagement by the underside of the brake lever 10 when the latter is moved by the motorcycle rider to effect braking of the front wheel. Moving the brake lever into engagement with cam 78 effects downward movement of the spring plate 56 and corresponding retraction of the catch pin 60 from the hole 58. Spring 38 thereupon urges the clamp sections 32 and 34 apart, releasing the throttle grip from its secured position at the selected cruising speed and allowing it to return quickly to idle position. Thus, automatic and instantaneous release of the throttle grip 50 is achieved when the operator squeezes the brake lever 10 and moves it toward the throttle grip to effect braking of the front wheel.

It is by means of the simplified and economical mechanism operated by the brake lever 10 that release of cruise control is achieved automatically and instantaneously without possibility of error or delay in execution, as is characterized by cruise control systems of the prior art.

Figure 5:
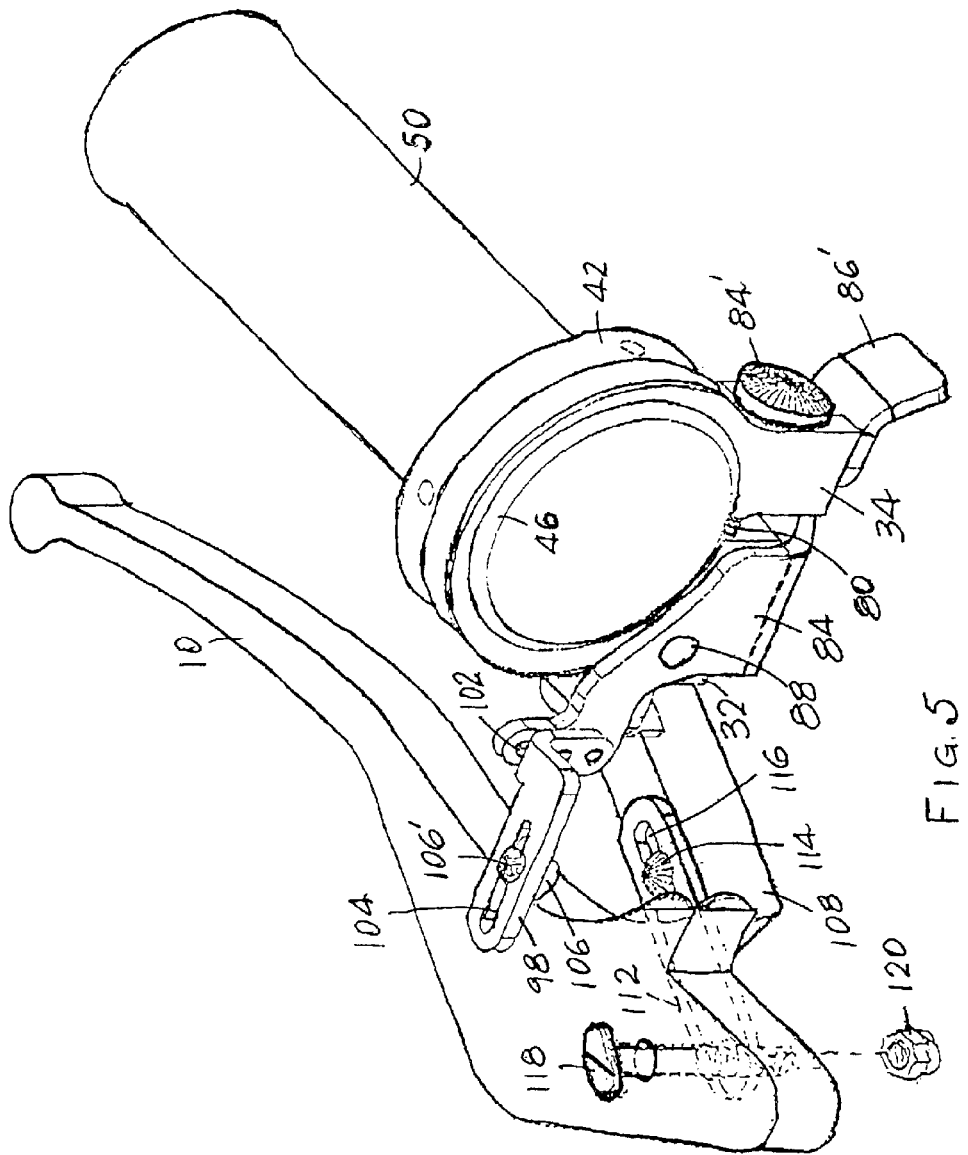
FIG. 5 is a perspective view of a second embodiment of motorcycle cruise control system which, like FIG. 1, is associated with the accelerator throttle grip and front wheel brake lever of a motorcycle.
Figure 6:
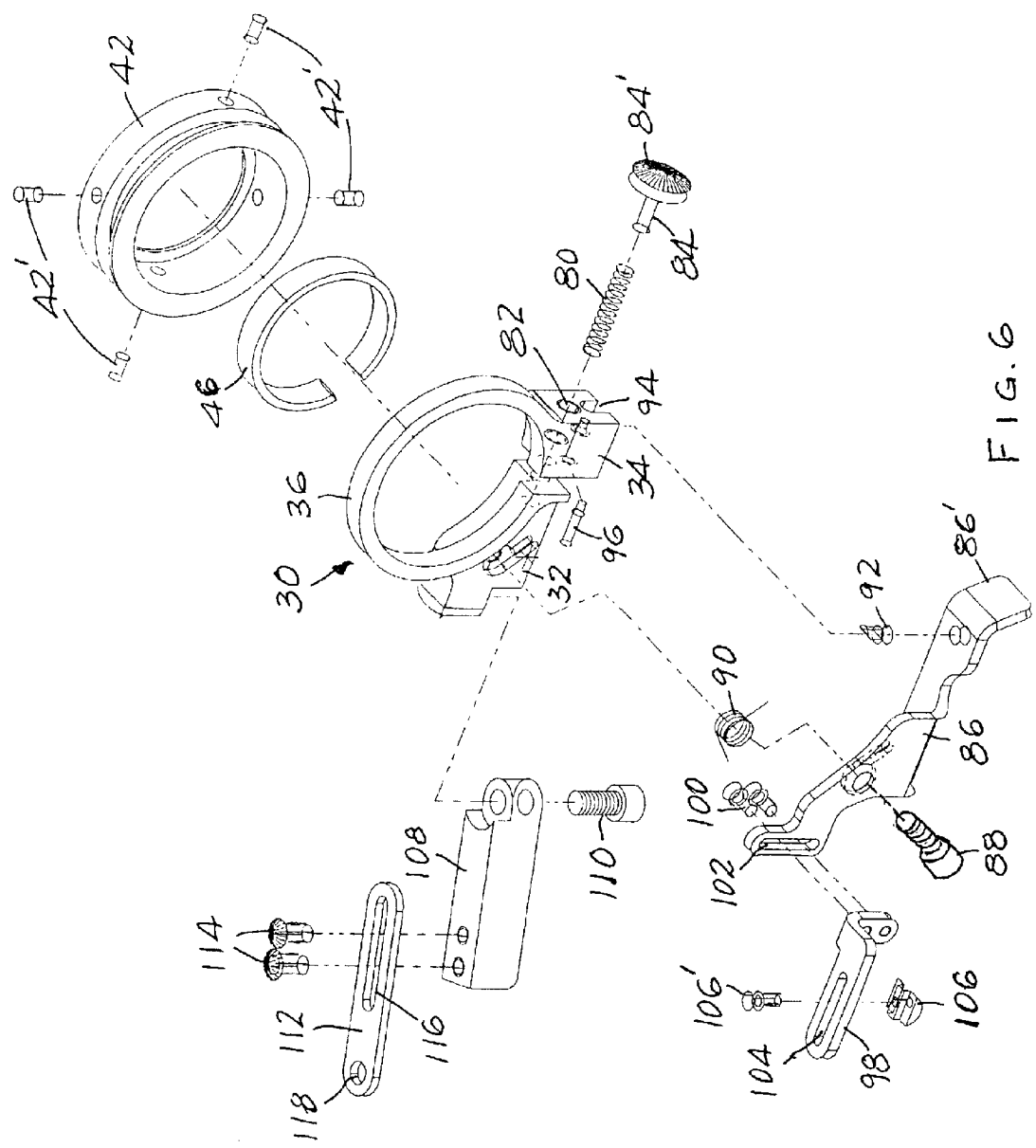
FIG. 6 is an exploded perspective view of the components of the system of FIG. 5.

The embodiment of FIGS. 5 and 6 differs from the previously described embodiment in the structural configuration of the mechanism which effects manual and automatic release of cruise control setting of the throttle grip 50. A coil spring 80 is retained in a bore 82 that extends through the clamp section 34 and into clamp section 32. A stop screw 84 is threaded into the bore 82 in clamp section 34 to retain the spring 80 in the bore. The spring 80 urges the clamp sections apart to release the throttle grip 50 for return to idle. A release lever 86 is supported for rotation intermediate its ends on pivot screw 88 secured to clamp section 32. A torsion spring 90 encircles screw 88, and the opposite ends of the spring engage the lever 86 and clamp section 32 to urge counterclockwise rotation of the lever. The offset end 86' of lever 86 is configured for engagement of a finger or thumb of the motorcycle rider to effect clockwise rotation of the lever 86 against the resilient resistance of torsion spring 90.

A catch pin 92 on the release lever adjacent the offset end 86' is urged by the counterclockwise rotation of lever 86 upward against the bottom of clamp section 34 when the clamp member 30 is open. When the clamp member is closed, by pressing against the push button head 84' of screw 84, the catch pin is moved upward into a slot 94 in the outer end portion of clamp section 34 by movement of lever 86. The catch pin engages an annular latch groove in an adjustable setscrew 96 that projects into the slot 94 and secures the closed position of the clamp member, against the resilient force exerted by the coil spring 80.

Manual release of the throttle grip 50 is achieved by pressing downward on the offset end 86' of release lever 86, as by the thumb of the motorcycle rider, to retract the catch pin 92 from the slot 94 and the latch groove of setscrew 96. This allows the spring 80 to move the clamp sections 32 and 34 apart and release the throttle to return to its idle position.

Automatic release of the throttle also is provided for. A brake release arm 98 is connected to the inner end of release lever 86 by screws 100 extending through an elongated slot 102 in lever 86. This affords adjustment of arm 98 to accommodate motorcycles of various makes and models. An elongated slot 104 in arm 98 receives a headed screw 106' for attachment to a cam 106 adjustably along the length of arm 98 to correspond with the path of movement of the brake lever 10 of the motorcycle.

A brake lever support arm 108 is connected pivotally at its inner end to a lateral extension of clamp section 32 by a pivot screw 110. This allows adjustment of the arm arcuately. The outer end of arm 108 supports an extension brake arm 112 by screws 114 extending through an elongated slot 116 in the lever 112. Pivotal adjustment of arm 108 and longitudinal adjustment of arm 112 affords appropriate adjustment of brake lever 10 which is secured pivotally to the outer end of brake arm 112 by bolt 118 and nut 120. The bolt and nut also secure the arm 112 to a mounting bracket (not shown) secured to the handlebar of a motorcycle.

When the operator of the motorcycle squeezes the brake lever 10 to brake the front wheel, the brake lever moves into engagement with cam 106. The cam moves the brake release arm 98 upward, rotating the brake release lever 86 clockwise about the axis of pivot screw 88. The opposite end of the brake release lever moves downward, retracting catch pin 92 from the slot 94 and the latch groove in setscrew 96, allowing the spring 80 to move clamp sections 32 and 34 apart. This releases the throttle grip 50 to return from the preset cruise speed position automatically to the idle position.

If desired, cruise control also may be effected by operation of the rear wheel foot brake of the motorcycle. This may be achieved by connecting a flexible cable at one end to the foot brake lever and the opposite end to the brake release arm 72 (FIG. 1) or the brake release lever 86 (FIG. 6) in a manner that affords independent actuation by either front or rear wheel brake lever.

It will be apparent to those skilled in the art that various other modifications and changes may be made in the size, shape, type, number and arrangement of parts described hereinbefore, without departing from the spirit of this invention and the scope of the appended claims.

I claim:

1. For use in a motorcycle having a rotary speed control and a pivoted brake lever, a non-electric motorcycle cruise control system with brake release, comprising:

a) movable mechanical means for releasably securing the rotary speed control against rotation at a selected motorcycle speed, and b) mechanical means operable by the pivoted brake lever for engaging the movable means and releasing its securement of the rotary speed control.

2. The non-electric system of claim 1 wherein the motorcycle includes a steering handlebar, the rotary speed control includes a hand grip mounted on said handlebar and the brake lever is mounted pivotally on the handlebar, and the movable mechanical means includes first and second clamp members engaging the rotary speed control and movable between a first position of interengagement for securing the rotary speed control against rotation from a preset cruising speed position above idle and a second position of disengagement for releasing the rotary speed control from said preset cruising position.

3. The system of claim 2 including
   a) catch pin means on one of said clamp members arranged to releasably engage the other of said clamp members,
   b) catch pin release means on the other of said clamp members movable between a first position interengaging said catch pin and said second clamp member and a second position disengaging said clamp pin from said second clamp member, and
   c) means operable by said pivoted brake lever for moving said catch pin release means from said first position to said second position for releasing said speed control from its preset position of cruising speed.

4. The system of claim 3 wherein
   a) the catch pin release means comprises a spring plate member having an opening therethrough configured to removably receive said catch pin, said plate member being mounted on said second clamp member for movement between said first position receiving said catch pin in said opening for securing said clamp members together and said second position displacing said catch pin from said opening for disengaging said clamp members from each other, the plate member being movable manually from said second position to said first position for receiving said catch pin in said opening and securing said clamp members together,
   b) release lever means mounted pivotally on said first clamp member and engaging said plate member for moving said plate member to remove said catch pin from said opening, to release said throttle grip for return to idle position, and
   c) means interengaging said plate member and brake lever for moving said plate member upon movement of said brake lever to brake the speed of the motorcycle to release said rotary speed control to return to idle position.

5. The system of claim 3 wherein
   a) The catch pin release means includes a catch pin lever mounted pivotally on said first clamp member and supporting said catch pin for reciprocating movement therewith toward and away from said second clamp member,
   b) latch means on said second clamp member arranged for removable reception of said catch pin,
   c) resilient means interengaging said first and second clamp members for urging said members apart, and
   d) means interengaging said catch pin lever and brake lever for disengaging said catch pin from said latch means and releasing said rotary speed control to return to idle position.

6. For use in a motorcycle having a rotary speed control and a pivoted brake lever, a non-electric motorcycle cruise control system with brake release, comprising mechanical linkage means interengaging the rotary speed control and pivoted brake lever for releasing the rotary speed control from a preset cruising speed position of rotation to return to idle position upon pivoting the brake lever to brake the speed of movement of the motorcycle.

7. For use in a motorcycle having a steering handlebar, a rotary speed control including a hand grip mounted on said handlebar and a brake lever mounted pivotally on the handlebar, a motorcycle cruise control system with brake release, comprising:
   a) movable means for releasably securing the rotary speed control against rotation at a selected motorcycle speed, the movable means including first and second clamp members engaging the rotary speed control and movable between a first position of interengagement for securing the rotary speed control against rotation from a preset cruising speed position above idle and a second position of disengagement for releasing the rotary speed control from said preset cruising position,
   b) catch pin means on one of said clamp members arranged to releasably engage the other of said clamp members,
   c) catch pin release means on the other of said clamp members movable between a first position interengaging said catch pin and said second clamp member and a second position disengaging said clamp pin from said second clamp member, and
   d) means operable by said pivoted brake lever for moving said catch pin release means from said first position to said second position for releasing said speed control from its preset position of cruising speed.

8. The system of claim 7 wherein:
   a) the catch pin release means comprises a spring plate member having an opening therethrough configured to removably receive said catch pin, said plate member being mounted on said second clamp member for movement between said first position receiving said catch pin in said opening for securing said clamp members together and said second position displacing said catch pin from said opening for disengaging said clamp members from each other, the plate member being movable manually from said second position to said first position for receiving said catch pin in said opening and securing said clamp members together,
   b) release lever means mounted pivotally on said first clamp member and engaging said plate member for moving said plate member to remove said catch pin from said opening, to release said throttle grip for return to idle position, and
   c) means interengaging said plate member and brake lever for moving said plate member upon movement of said brake lever to brake the speed of the motorcycle to release said rotary speed control to return to idle position.

\* \* \* \* \*